United States Patent
Saidi et al.

(10) Patent No.: US 12,093,189 B1
(45) Date of Patent: Sep. 17, 2024

(54) MEMORY-SIDE PAGE ACTIVITY RECORDER

(71) Applicant: Amazon Technologies, Inc., Seattle, WA (US)

(72) Inventors: Ali Ghassan Saidi, Austin, TX (US); Adi Habusha, Moshav Alonei Abba (IL); Roland Paterson-Jones, Kommetjie (ZA); Ohad Gdalyahu, Haifa (IL)

(73) Assignee: Amazon Technologies, Inc., Seattle, WA (US)

( * ) Notice: Subject to any disclaimer, the term of this patent is extended or adjusted under 35 U.S.C. 154(b) by 262 days.

(21) Appl. No.: 16/588,394

(22) Filed: Sep. 30, 2019

(51) Int. Cl.
  *G06F 12/122* (2016.01)

(52) U.S. Cl.
  CPC .... *G06F 12/122* (2013.01); *G06F 2212/1016* (2013.01); *G06F 2212/304* (2013.01)

(58) Field of Classification Search
  CPC ........... G06F 12/122; G06F 2212/1016; G06F 2212/304
  USPC ....................................................... 711/136
  See application file for complete search history.

(56) References Cited

U.S. PATENT DOCUMENTS

| | | | |
|---|---|---|---|
| 6,470,238 B1 * | 10/2002 | Nizar ................. | G06F 13/1668 700/153 |
| 8,775,732 B1 | 7/2014 | Banerjee | |
| 9,229,657 B1 | 1/2016 | Rus et al. | |
| 9,256,542 B1 * | 2/2016 | Flower ................. | G06F 3/0649 |
| 2007/0124539 A1 * | 5/2007 | Mandler ............. | G06F 13/1668 711/128 |
| 2008/0109629 A1 | 5/2008 | Karamcheti et al. | |
| 2010/0161923 A1 * | 6/2010 | GadelRab ........... | G06F 12/1027 711/162 |
| 2011/0271070 A1 | 11/2011 | Worthington et al. | |
| 2012/0311271 A1 | 12/2012 | Klein et al. | |
| 2013/0332681 A1 * | 12/2013 | Miller ................. | G06F 13/1626 711/154 |
| 2014/0040698 A1 * | 2/2014 | Loh ..................... | G06F 11/1004 711/E12.001 |
| 2014/0136773 A1 * | 5/2014 | Michalak ................ | G06F 12/10 711/105 |
| 2014/0297964 A1 * | 10/2014 | Nakase ............... | G06F 12/1054 711/136 |
| 2015/0106582 A1 | 4/2015 | Mai et al. | |

(Continued)

OTHER PUBLICATIONS

U.S. Appl. No. 16/588,206 , Memory Scanner to Accelerate Page Classification, Sep. 30, 2019.

*Primary Examiner* — Gautam Sain
(74) *Attorney, Agent, or Firm* — Weaver Austin Villeneuve & Sampson LLP (57) ABSTRACT

Methods and integrated circuit devices for recording memory-side page activity are provided. Memory systems typically have a combination of faster memory devices and slower memory devices. Frequently accessed memory pages (hot pages) should be maintained in the faster memory devices while less frequently accessed memory pages (cold pages) should be maintained in the slower memory devices. To determine the memory pages that should be moved between the faster memory devices and the slower memory devices, counters may be implemented to count transactions to the memory pages. The counter values may be periodically checked to identify memory pages that can be moved from faster memory devices to slower memory devices, and vice-versa.

1 Claim, 6 Drawing Sheets

(56) References Cited

U.S. PATENT DOCUMENTS

| | | | |
|---|---|---|---|
| 2015/0293851 A1* | 10/2015 | Gschwind | G06F 12/0862 |
| | | | 711/118 |
| 2017/0109077 A1* | 4/2017 | Lee | G06F 12/0868 |
| 2017/0228322 A1* | 8/2017 | Chang | G06F 12/0868 |
| 2018/0046378 A1 | 2/2018 | Coburn et al. | |
| 2018/0129421 A1 | 5/2018 | Krishnasamy et al. | |
| 2018/0329712 A1* | 11/2018 | Palani | G06F 12/0868 |
| 2019/0227918 A1* | 7/2019 | Xu | G06F 12/1466 |
| 2020/0026657 A1* | 1/2020 | Franke | G06F 12/1036 |
| 2020/0050458 A1* | 2/2020 | Bouzguarrou | G06F 9/325 |
| 2020/0218668 A1 | 7/2020 | Han et al. | |
| 2021/0049101 A1 | 2/2021 | Ray et al. | |

\* cited by examiner

MEMORY-SIDE PAGE ACTIVITY RECORDER

BACKGROUND

Computer systems can have different types of memories, for example, main or system memory, cache memory, and storage memory. Main or system memory may be random access memory (RAM) (e.g., dynamic random access memory (DRAM)). Cache memory is high-speed static random access memory (SRAM) that a processor (e.g., central processing unit (CPU)) can access more quickly than it can access main or system memory (e.g., DRAM). Cache memory may be integrated directly into the CPU chip or placed on a separate chip that has a separate bus interconnect with the CPU. Cache memory may store program instructions and data that are used repeatedly in the operation of programs or information that the CPU is likely to need next. A CPU may access multiple levels of cache memory, with the levels physically closest to the CPU being small and fast, while the levels further away from the CPU are larger and slower.

Storage memory may be located within separate storage devices and can include hard disk drives (HDDs), solid state drives (SSDs), and storage arrays, among other memory. Storage memory is less expensive, but the read and write speeds are slower than DRAM. Storage class memory, for example, 3D XPoint, phase-change memory (PCM), resistive random-access memory (RRAM), magneto-resistive RAM (MRAM), etc., are memory technologies that are more expensive but faster than secondary memory, and lower cost but slower than DRAM.

A memory may be divided into pages. A memory page is a fixed-length contiguous block of memory. It can be the smallest unit of data for memory management by an operating system. Each memory page can be described by a single entry in a page table. The page table stores mappings between virtual memory addresses and physical memory addresses.

BRIEF DESCRIPTION OF THE DRAWINGS

Various embodiments in accordance with the present disclosure will be described with reference to the drawings, in which.

DETAILED DESCRIPTION

An operating system (OS) for a computer system often assigns host physical memory to serve as virtual memory for various applications. Using virtual memory in a computer system allows memory protection and the extension of physical memory beyond the main memory, such as dynamic random-access memory (DRAM). Thus, a processor may run kernels and applications using virtual memory addresses. In a virtualized environment, a hypervisor may assign host physical memory to a virtual machine.

A guest operating system (guest OS) on the virtual machine manages guest physical memory by assigning a contiguous guest virtual memory space to an application running on the virtual machine. Only the guest virtual memory is visible to the application. The hypervisor may manage host physical memory by mapping the host physical memory to guest physical memory for a virtual machine.

Computer systems may utilize various data storage devices to store different types of data, e.g., user data, system data, etc. The data storage devices may include different types of volatile or non-volatile memory devices, e.g., dynamic random access memories (DRAMs), static random access memories (SRAMs), flash devices, storage class memories (SCMs), etc. The SRAM and DRAM devices may typically provide non-persistent data storages (e.g., the stored data may be erased when power supply to those devices is off) but may have limited capacity.

The SCM devices may be used, for example, as a buffer device between the DRAM device and a hard drive. The SCM devices can provide persistent storage for data and may include, e.g., flash-based NAND devices, resistive random-access memory (RRAM) devices, etc. Moreover, the SCM devices can be organized as dual in-line memory modules (DIMM), in the same form as DRAM DIMMs. The SCM DIMMs can also be connected to a board through the same high speed interfaces designed for DRAM DIMMs, which can improve the data transfer speed of SCM DIMMs. SCM can have higher latency (i.e., be slower) or have lower maximum bandwidth than DRAM.

Memory may be divided into fixed-length contiguous blocks of memory, referred to as pages. A memory page is the smallest unit of data for memory management by an operating system. Page size may be determined by the processor architecture. A page size may be, for example, 4096 bytes (4 kB) or another size. Each memory page can be described by a single entry in a page table. The page table stores mappings between virtual memory addresses and physical memory addresses.

To use the different kinds of memory efficiently and to reduce system costs, frequently accessed memory pages should be kept in the faster memory while memory pages accessed infrequently may be moved to a medium that may be slower (i.e., have higher latency or lower maximum bandwidth). By identifying which pages of memories are accessed less frequently than other pages, the less frequently accessed pages may be moved to slower, less expensive memory to provide more availability of faster memory for pages that are accessed more frequently.

One method to identify the frequency with which memory pages are read from or written to uses the accessed bits in the page table. This can be done by configuring the page table to interrupt to the hypervisor directly when a page is accessed, by scanning the access bits periodically and noting which ones are set and resetting them, or by checking the access bits in the page table and generating an interrupt to the hypervisor, or logging with a page-activity log, when the first access occurs. This method, however, provides only a low-fidelity, high-cost way of determining memory page accesses.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Computer systems can have different kinds of memories. One kind of memory might be slower or more expensive than another kind. Frequently accessed pages of memories that are assigned to guests should be placed in the more expensive (faster) memory. Pages that are being accessed infrequently can be moved to a less expensive medium (slower or having higher latency or allows less transactions per second). The frequently accessed (e.g., hot) pages and the infrequently (e.g., cold) pages may be identified by recording accesses to the memory pages.

Various aspects of the present disclosure provide systems and methods for memory-side page activity recording to determine memory pages that can be moved or swapped from faster, more expensive memory to slower, less expensive memory based on frequency of access. According to certain aspects of the present disclosure, counters may be implemented for a set of memory pages of a memory, for example, the main or system memory (e.g., DRAM). The counters may be implemented in a reserved portion of the memory such that the operating system (OS) will not otherwise use that portion of memory for applications or data. Every time a request goes to the memory, the request may be monitored. For example, the base memory address associated with the request may be determined, and some simple calculations can be performed on the base address, such as shifting it to get to a particular page and offsetting it by the size of the counter, and then incrementing the counter at the calculated location.

A value of a counter may be incremented each time a transaction (e.g., a read or write operation) occurs involving an address in the corresponding memory page. The counters may be checked periodically, for example every second or another time period, to determine less frequently accessed memory pages and identify those memory pages as candidates to be moved from the main or system memory to a secondary memory that may have higher latency or lower maximum bandwidth than the main or system memory. A histogram, i.e., the distribution of counter value data, representing the number of access to particular pages, can be created and used to find candidate pages for movement to less-expensive and slower media or for compression.

Figure 1:
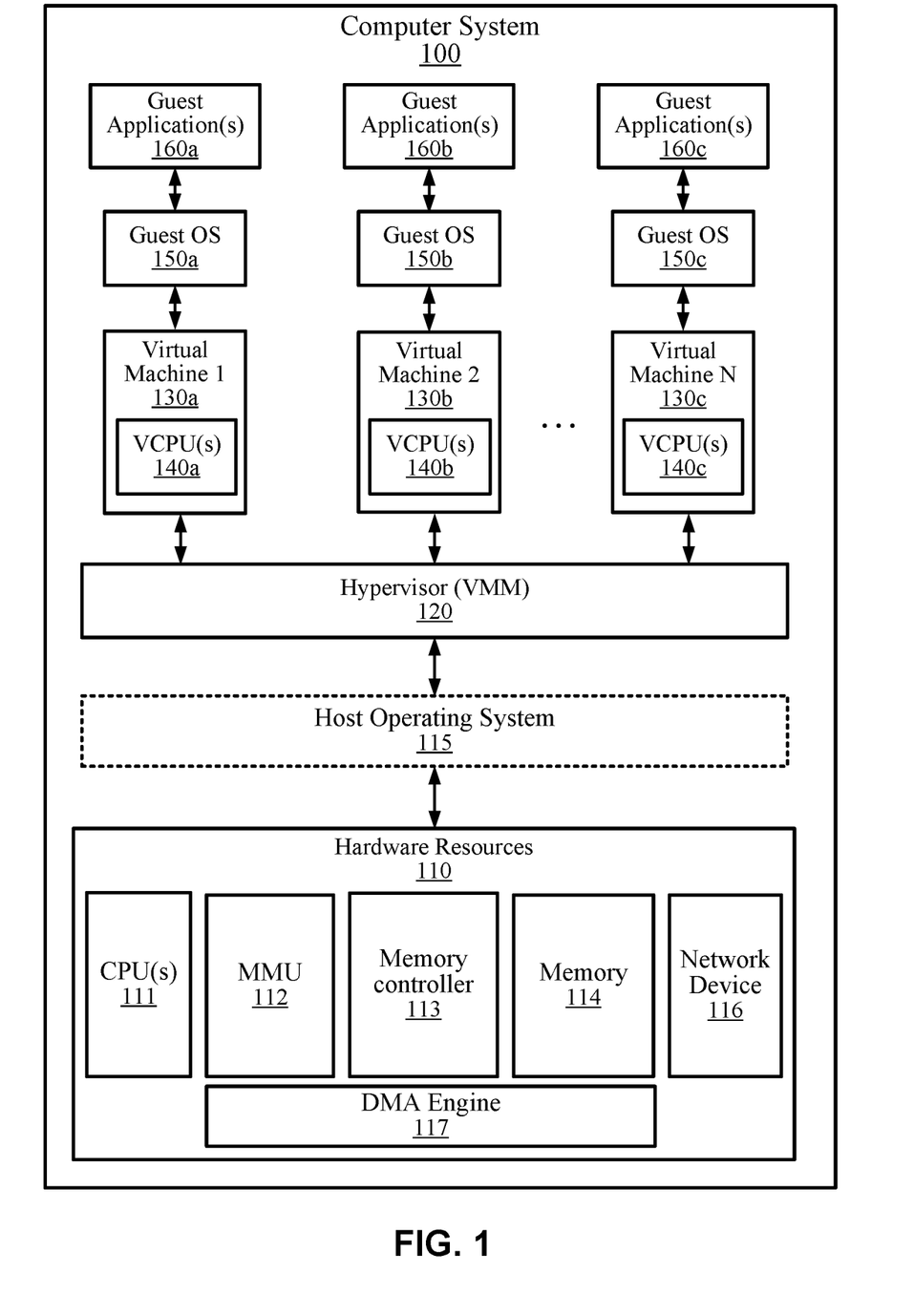
FIG. 1 is a simplified block diagram of an example of a virtualized computer system, according to aspects of the present disclosure.

FIG. 1 is a simplified block diagram of an example of a virtualized computer system 100, according to certain aspects of this disclosure. The computer system 100 may include a host operating system 115 executing on hardware resources 110. The hardware resources 110 may include one or more CPUs 111, memory 114, one or more memory controllers 113, a network device 116, a direct memory access (DMA) engine 117, or any suitable components. The DMA engine can be implemented, for example, using direct memory access circuitry or programmable logic. The programmable logic may include one or more processing cores operable to read data structures from memory and may be programmable to perform processing operations, for example, but not limited to, classification, least recently used (LRU) sorting, etc. The hardware resources 110 may also include a memory management unit (MMU) 112 for translating the virtual memory addresses to host physical memory addresses. A hypervisor 120 may execute on the computer system 100 to manage a plurality of virtual machines (VMs), such as VM-1 130*a*, VM-2 130*b*-VM-N 130*c*, where N is at least one and may be up to, for example, 10 or more, 20 or more, or 100 or more.

The hypervisor 120, also referred to as virtual machine manager (VMM), can emulate multiple virtual devices on a single device in a virtualized environment. The hypervisor 120 can also manage the flow of information between software, the virtualized hardware, and the physical hardware. The hypervisor 120 may be configured to create, start, monitor, stop, or delete each of VM-1-VM-N 130*a*-130*c*, and may execute at a higher privilege level than VM-1-VM-N 130*a*-130*c*. In some implementations, the hypervisor 120 can manage access controls, resources, scheduling, isolation, etc., for VM-1-VM-N 130*a*-130*c* executing their respective guest operating systems (not shown).

The hypervisor 120 may be implemented as a software layer or as code embedded in a firmware on computer system 100. Even though the hypervisor 120 is shown in FIG. 1 as a type-2 hypervisor (e.g., hosted hypervisor), it will be understood that the hypervisor 120 may also be implemented as a type-1 hypervisor (e.g., bare-metal hypervisor), or any other suitable implementation.

Each of VM-1-VM-N 130*a*-130*c* may be assigned to one or more virtual CPUs (VCPUs) 140*a*, 140*b*, or 140*c*. The VCPUs 140*a*-140*c* are mapped to allocated time slices of available logical processors in the physical computer and can be scheduled by the hypervisor 120 to allow more virtual processors than available physical processors. One or more guest operating systems 150*a*-150*c* may run on the one or more of the VCPUs 140*a*-140*c* in VM-1-VM-N 130*a*-130*c*, respectively. One or more guest applications 160*a*-160*c* may in turn run on and be managed by the corresponding guest operating systems.

Each of VM-1-VM-N 130*a*-130*c* may be any suitable emulation of a computer system that may be managed by hypervisor 120. Each of VM-1-VM-N 130*a*-130*c* can run an independent operating system and one or more applications or processes on hardware resources 110. For example, in some instances, VM-1-VM-N 130*a*-130*c* may perform a write operation to store data in the memory 114, or a read operation to read data stored in the memory 114. As described above, the memory 114 may include DRAM, SRAM, SCM, or any other suitable memory.

Two or more VMs from VM-1-VM-N 130*a*-130*c* may execute simultaneously or in any order on the computer system 100. For example, in some instances, at a given time, VM-1-VM-N 130*a*-130*c* may execute simultaneously on the computer system 100. In some instances, VM-1-VM-N 130*a*-130*c* may execute on the computer system 100 one at a time. For example, the hypervisor 120 may create and start VM-1 130*a* for a first user. After the user finishes running applications or processes on VM-1 130*a*, the hypervisor 120 may stop and delete VM-1 130*a*, and create and start VM-2 130*b* for a second user, and so on.

Before a VM from VM-1-VM-N 130*a*-130*c* starts executing, the hypervisor 120 may allocate a certain portion of the memory 114 to that VM. As an example, the hypervisor 120 may allocate a first VM memory to VM-1 130*a* when VM-1 130*a* is created or before VM-1 130*a* starts executing. The first VM memory may correspond to a first physical memory space in memory 114.

When the hypervisor 120 allocates physical memory to a VM, it may maintain a memory mapping table or page table that maps virtual memory pages for different VMs to pages in physical memory 114, such that, when the CPU(s) 111 needs to access a virtual memory address, the MMU 112 may translate the virtual memory address to a corresponding physical memory address based on the page table, so that the CPU(s) 111 may actually access the corresponding physical memory address to read or write data.

Figure 2:
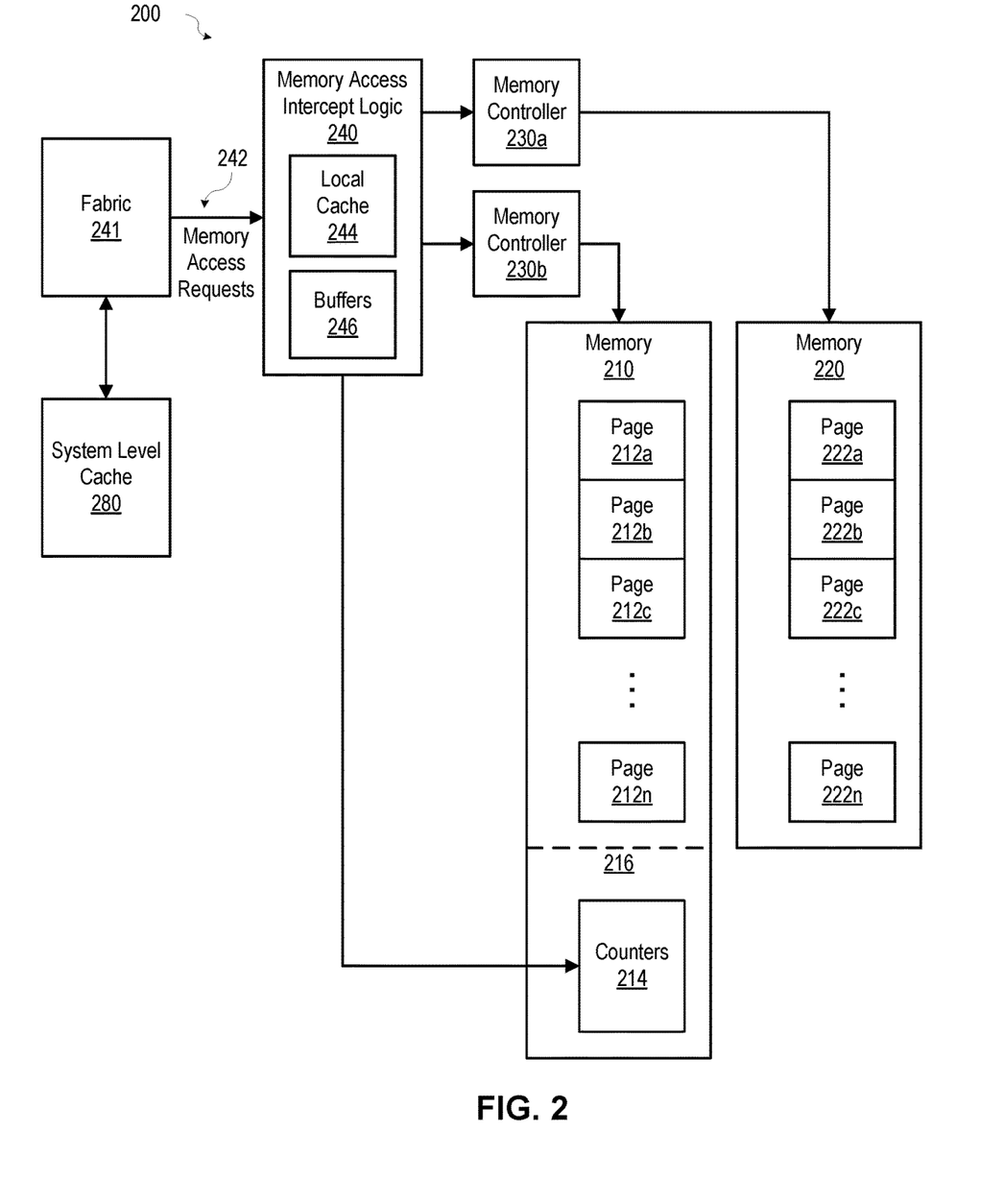
FIG. 2 is a simplified block diagram of an example portion of a memory subsystem according to aspects of the present disclosure.

FIG. 2 is a simplified block diagram of an example portion of a memory subsystem 200 according to aspects of the present disclosure. Referring to FIG. 2, the portion of a memory subsystem 200 may include a first memory 210, a second memory 220, memory controllers 230a, 230b, and memory access intercept logic 240.

The first memory 210 may be the main or system memory. The first memory 210 may be a faster memory than the second memory 220. The first memory 210 can be, for example, DRAM, SRAM, a combination of DRAM and SRAM, or another type of memory. The first memory 210 may be divided into fixed-length contiguous blocks of memory, referred to as pages 212a-212n. A memory page is the smallest unit of data for memory management by an operating system. For example, an OS can remap a memory page to a different address transparently to an executing application. A page size may be, for example, 4096 bytes (4 kB) or another size determined by the processor architecture or operating system. A page table stores mappings between virtual memory addresses operated on by the VMs and addresses in the physical memory of the computer system.

According to aspects of the present disclosure, the first memory 210 may include a set of page counters 214 configured to count the number of accesses (e.g., read operations and write operations) to each page of memory in the first memory 210. In some implementations, the set of page counters 214 may also include counters to count the number of accesses to each page of memory in the second memory 220, or the second memory 220 may implement its own set of counters. The set of page counters 214 may be may be implemented in a reserved portion 216 of the first memory 210 that cannot be overwritten with instructions or data by the OS. The reserved portion 216 of memory may be referred to as an access log. Each page counter in the set of page counters 214 may have an address in the reserved portion 216 of the first memory 210 that may be directly or indirectly addressed.

The reserved portion 216 of memory may have a specified base address and an address bound specifying the size of the reserved portion 216 used for the page counters. In order to avoid infinite loops that could result from continually counting memory reads and writes to the page counters, a mechanism may be implemented to ignore read and write operations to the page counters in the reserved portion of memory such that operations on the page counters are not counted.

Each page counter in the set of page counters 214 may have a specified size, for example, 16 bits or another size. In some implementations, one or more of the page counters may be saturating counters such that when a maximum counter value is reached, the page counter will not increment further until the page counter is reset. One page counter may be implemented for each page of memory in both the first memory 210 and the second memory 220. Thus, for a computing system having a terabyte of memory and a 4 kB page size, millions of page counters may be implemented.

Similar to other frequently accessed memory locations, page counters that are being frequently updated can be cached. The page counters at the corresponding addresses of the access log (i.e., the reserved portion of memory (DRAM)) may be periodically updated to the counts of the cached page counters. Accordingly, the frequent page counter updates may not increase DRAM traffic substantially.

The page counters may be read periodically, for example every second or another time period, by the hypervisor, the guest OS, host OS, or by another mechanism, to determine the number of accesses to each page of the first and second memories. Based on the page counter values, hot pages (e.g., pages that have been frequently accessed) and cold pages (e.g., pages that have been infrequently accessed) can be identified. Hot pages may remain in or be moved to the first (e.g., faster) memory 210, while cold pages may remain in or be moved to the second (e.g., slower) memory. The page counter values may be reset to an initial value, for example zero or another value, after each periodic read.

The second memory 220 may be SCM, for example, 3D XPoint memory or another type of memory. The SCM of the second memory 220 may be slower than the DRAM or SRAM of the first memory 210. The second memory 220 can be byte-accessible such that the CPU can access it directly. The first memory 210 may also be divided into pages 222a-222n. The page size for the second memory 220 may be, for example, 4096 bytes (4 kB) or another size determined by the processor architecture.

The MMU (e.g., the MMU 112) may map memory addresses between the guest virtual memory and the guest physical memory, and between the guest physical memory and the host physical memory. The MMU may use a page table in the main memory for each executing process to map virtual page numbers in the virtual address space to physical page numbers in main memory. The page table may include one page table entry (PTE) for each page. Every time the CPU accesses a memory, the MMU translates a virtual address into a corresponding physical address.

The memory controllers 230a, 230b may be configured to handle the physical signaling involved in communicating to memory 210, 220. The memory access intercept logic 240 may be disposed to intercept memory access requests (e.g., reads and writes) 242 that are received from a fabric 241 and presented to the memory controllers 230a, 230b and may update the page counters for the memory pages associated with the memory access requests 242. In some implementations, the memory access intercept logic may reside between a last level cache of system level cache 280 and the memory 210, 220. The memory access intercept logic 240 may generate transactions through the memory controllers 230a, 230b and update the page counters 214. The memory access requests 242 may be read operations and write operations to virtual memory addresses. The memory access intercept logic 240 may intercept the memory access requests 242 going to the memory controllers 230a, 230b. Based on the address of the access request, the memory access intercept logic may calculate the address of the corresponding page counter and inject a 16-bit atomic saturating add (e.g., for a 16-bit counter) to the counter address to increment the counters. The counter values can be used to build a histogram, i.e., a distribution of counter value data. The CPU can periodically find the hottest or coldest pages and reset the counters, for example via the host OS or hypervisor.

The memory access intercept logic 240 may include a local cache 244 for frequently updated counters and buffers 246 to compensate for bursty memory activity. The memory access intercept logic 240 may hold a number of page counters for frequently accessed memory pages in the local cache 244. Caching the page counters can reduce updating the frequently accessed page counters of the access log in DRAM at the same rate as the memory is accessed. In some implementations, the page counters stored in the local cache 244 may be periodically evicted, for example, every few milliseconds or another time period. The time period may be configurable. When a page counter is evicted from the local cache 244, the corresponding page counter in the reserved portion of memory may be updated. When a memory page is evicted or replaced, the local counter value corresponding to the memory page in the memory access intercept logic cache can be added to the page counter of the access log. Since the reserved region of memory containing the page counters is system memory, frequently accessed page counters may reside in the system level cache similar to other frequently accessed memory locations. Thus, the local counter value may update a page counter value in the system level cache.

Using the cache, multiple updates to the counters during bursty memory activity can be aggregated, and one update can be sent to the counter. For example, rather than 20 individual updates being sent to increment a particular counter, the increments may be aggregated in the cache. One update (e.g., +20) may be sent to the counter. Additionally, since the operations themselves take place in the cache, the cache will buffer cache lines consisting of hot atomic counters rather than sending updates directly to the counters of the access log in DRAM.

In some implementations, the memory access intercept logic 240 may receive feedback signals from the memory system, for example from the memory controllers 230*a*, 230*b*, indicating the level of memory activity. In cases where the memory activity is high, for example during bursts of memory access requests, the memory access intercept logic 240 can temporarily slow down the rate of page counter updates by buffering the updates in an internal buffers 246. The memory access intercept logic 240 may buffer the page counter increments and send one update to the page counter for the total number of increments rather than sending each individual increment.

The memory access intercept logic 240 may have a fixed amount of buffering. When the buffers 246 fill up, it indicates that a large number of transactions (e.g., page counter updates) are being injected in the memory system and are not completing quickly. This condition has the potential to create a deadlock in the computing system. In such cases, when the buffers 246 fill to a predetermined level, the memory access intercept logic 240 may throttle the number of page counter updates and provide an indicator, for example set one or more flags, to indicate that some number of page counter updates have been lost. The memory access intercept logic 240 may set one or more flags in a device configuration register and signal an interrupt to the OS or hypervisor to indicate that an overflow has occurred. The CPU may then either take action (e.g., move hot and cold pages based on the page counter values) or take no action with respect to the memory pages, clear the page counters, and cause the memory access intercept logic to begin monitoring memory access requests and updating the page counters.

Thus, as the system is running, a view of which are the hottest pages in memory and which are the coldest pages in memory is being built that can be used to make decisions about moving some of these pages to different types of memory. For instance, the hotter pages may be left in high performance memory and the colder pages may be moved to lower cost or slower memory. In some implementations, the results of the page counters may be used to load-level the memory controllers. For example, if a large number of hot memory pages is being accessed through one memory controller, the load may be spread by moving memory pages to other memory controllers based on the results of the page counters.

In some implementations, rather than updating every page counter on every access request to the associated memory page, the page counters may be updated statistically. For example, using a random number that can be either zero or one associated with each transaction (e.g., page counter update), the page counter update can be sent if the random number is one, and not sent if the random number is zero. In some implementations, another numerical value may be used. The page counter may be updated if the numerical value satisfies a specified condition, for example, but not limited to, greater than or less than a specified threshold value, and the page counter may not be updated if the numerical value does not satisfy the specified condition. The threshold values may be configured, for example, via a driver program running in the host OS or the guest OS, or by another method. Since the information from the page counters is used to indicate the relative activity of each memory page (e.g., which memory pages are hotter or colder than others), statistically the same set of accesses may be generated with half the number or another fraction of write operations to the page counters in memory. In some implementations, a page counter may be incremented after a specified number of access requests to the associated memory page have been received. The number of received access request may be reset each time the counter is updated. For example, when 20 or another number of access requests have been received for a particular memory page, the associated page counter may be incremented by one count. When the page counter is updated, the number of access requests may be reset, for example, to zero.

In some cases, the computer system may generate enough memory activity to cause page counters to wrap or overflow. For example, an 8-bit counter can count 255 transactions; on the 256th transaction the counter would wrap back to zero. In some implementations, larger counters may be used, or the counters may be read and cleared by the host OS, guest OS, or hypervisor in shorter time frames. In some implementations, an atomic saturating add can be used to update the counters. Rather than performing a load, increment, and store or executing an atomic increment instruction to the page counter address in memory, the atomic saturating add causes the counter to stop incrementing when it reaches the maximum value. Memory pages associated with the saturated page counters can be identified as hot pages.

In some implementations, the memory access intercept logic 240 may be implemented in hardware, for example, as circuitry on the processor integrated circuit or an integrated circuit supporting the process. In a hardware implementation, the memory access intercept logic 240 can be configured to perform the monitoring of the memory access requests and updating of the page counters. The OS, the hypervisor, or firmware running at a higher privilege level than the hypervisor, may periodically read and clear the page counters to identify the highest and lowest values and use the page counter values to decide whether a page migration should be performed and which pages can be migrated. In some implementations, the memory access intercept logic 240 may be implemented in software or firmware. In other implementations, the memory access intercept logic 240 may be implemented as a combination of hardware and software.

Figure 3:
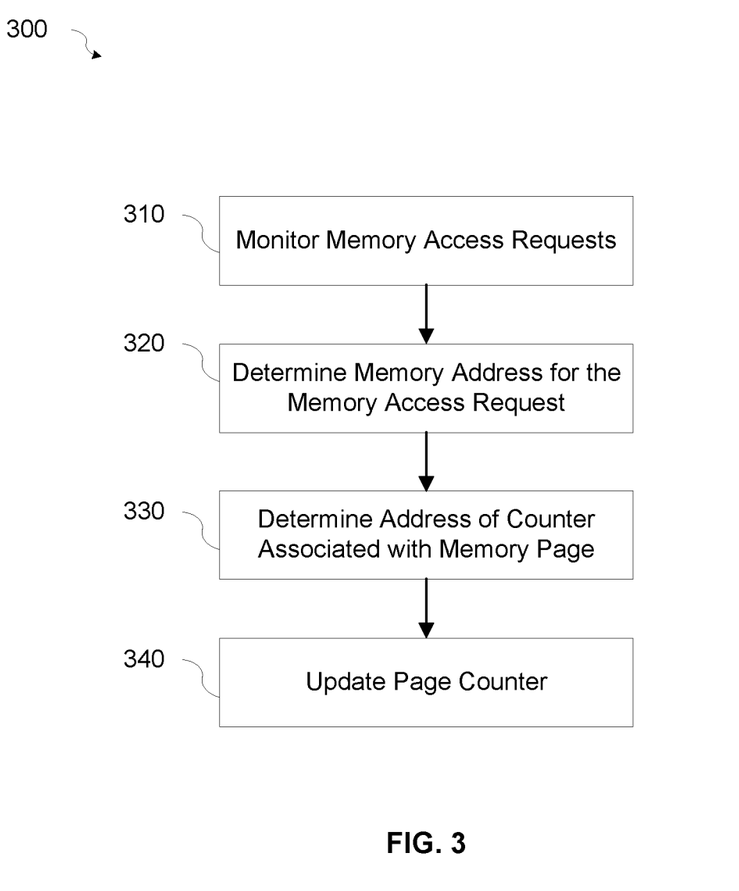
FIG. 3 is a flowchart illustrating an example of a method for recording memory page activity according to aspects of the present disclosure.

FIG. 3 is a flowchart illustrating an example of a method 300 for recording memory page activity according to aspects of the present disclosure. Referring to FIG. 3, at block 310, memory access requests may be monitored. Memory access requests to the main or system memory (e.g., DRAM) may be received, for example, from any of a number of VMs or other devices operating on a computer system. Memory access intercept logic (e.g., memory access intercept logic 240) may intercept the access requests going to the memory controller. The memory access intercept logic may be disposed in a communication path to the memory controllers (e.g., memory controllers 230a, 230b) and may be configured to intercept memory access requests (e.g., reads and writes) sent to the MMU.

At block 320, for any memory access request, an address for the memory access request may be determined. The memory access request may include, among other things, an address to which data is to be written to or read from. The address may be a virtual address or a physical address, and may contain a memory page number. When the address is a virtual address, a page table may map the virtual address to a physical address in the main memory. The memory access intercept logic may determine the memory address for the memory access request and may determine the memory page associated with the memory address.

At block 330, an address of a page counter associated with the memory page may be determined. For example, the memory access intercept logic may determine the base memory address associated with the memory access request. The memory access intercept logic may perform some calculations on the base memory address, for example, shifting it to get to a particular page and offsetting it by the size of the counter, to determine the address of the page counter associated with the memory page. As an example, the address of the memory page may be calculated by shifting the page counter address 14 bits to the right, multiplying the shifted address by two, and adding the result to the base address of the database. As another example, the address of the page counter can be looked up in a mapping table that identifies the counter location from a page address.

A set of page counters may be implemented in a reserved portion of the main memory that cannot be overwritten with instructions or data by the host OS. Each page counter in the set of page counters may have an address in the reserved portion of the main memory that may be directly or indirectly addressed. In some cases, page counters that are being frequently updated will remain in a system level cache or in a local cache in the memory access intercept logic. The page counters may be configured to count the number of accesses (e.g., read operations and write operations) to each page of memory in both the main memory and a secondary memory. The secondary memory may be, for example, and SCM or another type of memory.

Each page counter in the set of page counters may have a specified size, for example, 16 bits or another size. In some implementations, one or more of the page counters may be saturating counters such that when a maximum counter value is reached, the page counter will not increment further until the page counter is reset. One page counter may be implemented for each page of memory in both the main memory and the secondary memory.

At block 340, the page counter associated with the memory page may be updated. A value associated with the memory page may be incremented each time a transaction (e.g., a read or write operation) occurs involving an address in the corresponding memory page. Based on the address of the access request, the memory access intercept logic may calculate the address of the corresponding page counter and inject a 16-bit atomic saturating add (e.g., for a 16-bit counter) to the page counter address to increment the page counters. In some implementations, the atomic add may not be a saturating add. The page counter values can be used to build a histogram, i.e., a distribution of counter value data.

The memory access intercept logic 240 may include a local cache configured to hold a number of frequently updated page counters, and may also include buffers to compensate for bursty memory activity. When a memory page is evicted or replaced, the value in the local counter (e.g., in the local cache) corresponding to the memory page can be added to the page counter in the reserved portion of main memory. Since the reserved region of memory containing the page counters can be system memory, frequently accessed page counters may reside in the system level cache similar to other frequently accessed memory locations. Thus, the local counter value may update a page counter value in the system level cache. Using the cache, multiple updates to the counters during bursty memory activity can be aggregated, and one update sent to the counter. For example, rather than 20 individual updates being sent to increment a particular page counter, the increments may be aggregated in the cache. One update (e.g., +20) may be sent to the page counter.

In some implementations, the memory access intercept logic 240 may receive feedback signals from the memory system, for example, from the memory controller, indicating the level of memory activity. When the memory activity is high, for example, during bursts of memory access requests, the memory access intercept logic can temporarily slow down the rate of page counter updates by buffering the updates in internal buffers. To avoid deadlock, when the buffers fill to a predetermined level, the memory access intercept logic may throttle the number of page counter updates and provide an indicator, for example, set one or more flags, to indicate that some number of page counter updates have been lost.

It should be appreciated that the specific steps illustrated in FIG. 3 provide a particular method for recording memory page activity according to various implementations. Other sequences of steps may also be performed according to alternative implementations. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
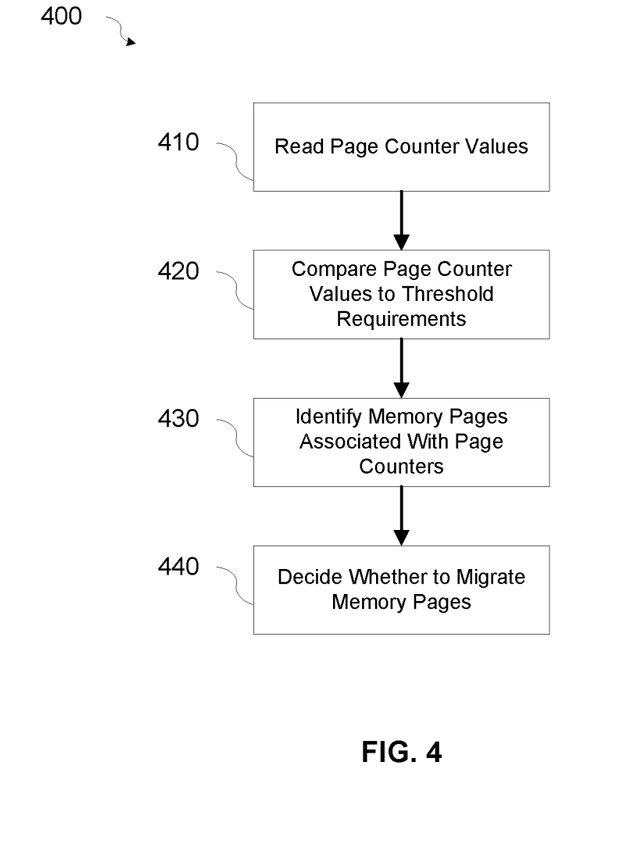
FIG. 4 is a flowchart illustrating an example of a method for identifying hot and cold memory pages according to aspects of the present disclosure.

FIG. 4 is a flowchart illustrating an example of a method 400 for identifying hot and cold memory pages according to aspects of the present disclosure. Referring to FIG. 4, at block 410, the page counter values may be read. For example, the hypervisor, the OS, or another mechanism may periodically scan the page counters, and read them to determine the number of accesses to each page of the main and secondary memories. The page counter values may be reset to an initial value, for example, zero or another value, after each periodic read.

At block 420, the page counter values may be compared to threshold requirements. In some implementations, one or more access request threshold values may be set to classify a memory page as a hot page or a cold page. The threshold values may be configured, for example, via a driver program running in the host OS or the guest OS, or by another method. For example, in some implementations, an access request threshold value may be set, and above which a memory page is classified as a hot page and may be considered a candidate for migration to a fast memory. Memory pages that do not exceed the access request threshold value may be classified as cold pages. In some implementations, a first access request threshold value may be set, and above which a page is classified as a hot page and may be considered a candidate for migration. A second access request threshold value may be set, and below which a page is classified as a cold page and may be considered a candidate for migration. Memory pages having page counter values between the two thresholds may not be considered a candidate for migration. In some implementations, the M memory pages having the highest page counter values may be classified as hot pages, and the N memory pages having the lowest page counter values may be classified as cold pages, where M and N are integer values. Other schemes for determining access request threshold values for hot and cold memory pages may be used without departing from the scope of the present disclosure.

At block 430, memory pages associated with page counters having values that meet the threshold requirements may be identified. For example, the CPU, via the hypervisor or OS may determine which page counters may be classified as hot pages and cold pages. Based on the page counter values, the CPU may identify the memory addresses for hot pages (e.g., pages that have been frequently accessed) and memory addresses for cold pages (e.g., pages that have been infrequently accessed) from the page counter addresses. For example, the CPU may perform some calculations on the memory address of a page counter to determine the address of the memory page associated with the page counter. For example, the address of the memory page may be calculated by shifting the page counter address 14 bits to the right, multiplying the shifted address by two, and adding the result to the base address of the database.

At block 440, a decision may be made whether to migrate memory pages. The decision regarding whether or not to migrate a memory page may be made by the CPU. Hot pages may remain in or be moved to the main (e.g., faster) memory 210, while cold pages may remain in or be moved to the secondary (e.g., slower) memory. In some implementations, the decision to migrate memory pages may depend at least in part on available memory in the main and secondary memories.

It should be appreciated that the specific steps illustrated in FIG. 4 provide a particular method for identifying hot and cold memory pages according to various implementations. Other sequences of steps may also be performed according to alternative implementations. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
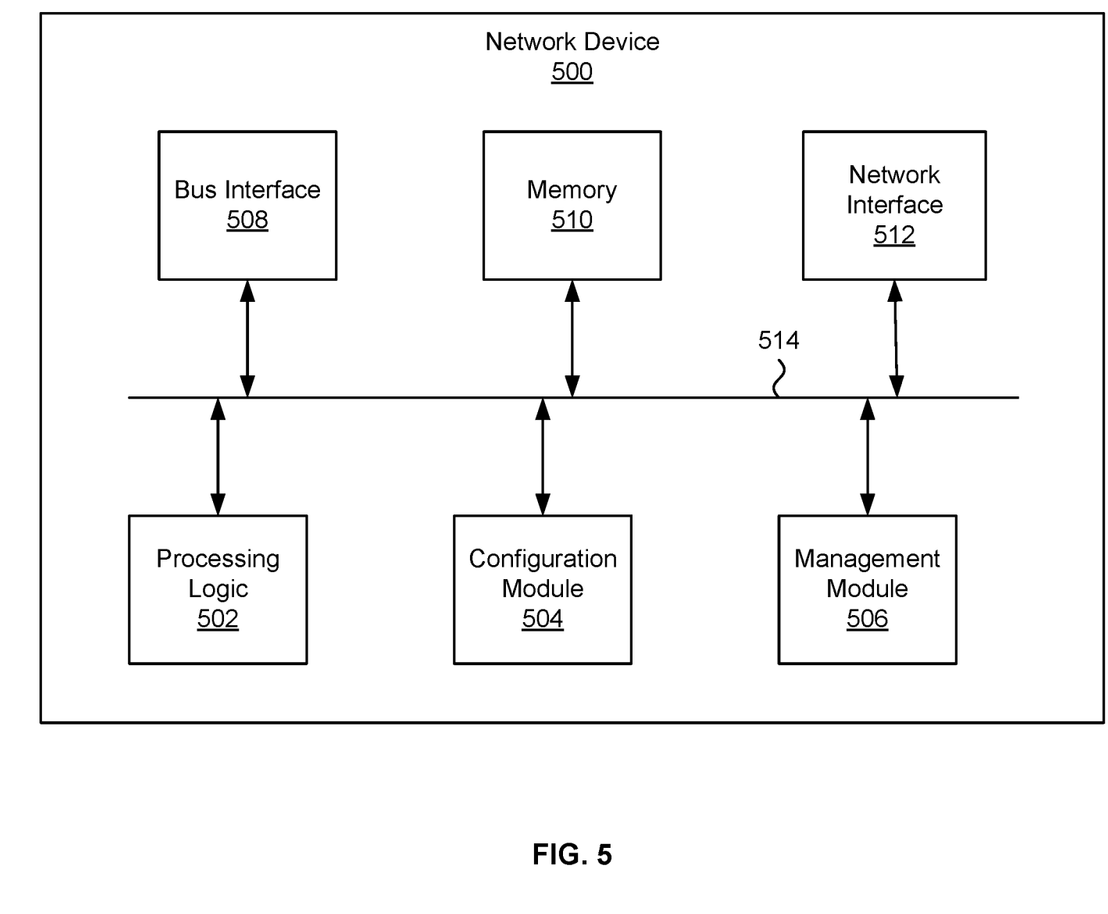
FIG. 5 illustrates an example of a computing device, according to certain aspects of the disclosure.

FIG. 5 illustrates an example of a network device 500. Functionality and/or several components of the network device 500 may be used without limitation with other embodiments disclosed elsewhere in this disclosure, without limitations.

In one example, the network device 500 may include processing logic 502, a configuration module 504, a management module 506, a bus interface module 508, memory 510, and a network interface module 512. These modules may be hardware modules, software modules, or a combination of hardware and software. In certain instances, modules may be interchangeably used with components or engines, without deviating from the scope of the disclosure. The network device 500 may include additional modules, not illustrated here, such as components discussed with respect to the nodes disclosed in FIG. 6. In some implementations, the network device 500 may include fewer modules. In some implementations, one or more of the modules may be combined into one module. One or more of the modules may be in communication with each other over a communication channel 514. The communication channel 514 may include one or more busses, meshes, matrices, fabrics, a combination of these communication channels, or some other suitable communication channel.

The processing logic 502 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 502 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 502 may be stored on a computer-readable storage medium, for example, in the form of a computer program. The computer-readable storage medium may be non-transitory. In some cases, the computer-readable medium may be part of the memory 510.

The memory 510 may include either volatile or non-volatile, or both volatile and non-volatile types of memory. The memory 510 may, for example, include random access memory (RAM), read only memory (ROM), Electrically Erasable Programmable Read-Only Memory (EEPROM), flash memory, and/or some other suitable storage media. In some cases, some or all of the memory 510 may be internal to the network device 500, while in other cases some or all of the memory may be external to the network device 500. The memory 510 may store an operating system comprising executable instructions that, when executed by the processing logic 502, provides the execution environment for executing instructions providing networking functionality for the network device 500. The memory may also store and maintain several data structures and routing tables for facilitating the functionality of the network device 500.

In some implementations, the configuration module 504 may include one or more configuration registers. Configuration registers may control the operations of the network device 500. In some implementations, one or more bits in the configuration register can represent certain capabilities of the network device 500. Configuration registers may be programmed by instructions executing in the processing logic 502, and/or by an external entity, such as a host device, an operating system executing on a host device, and/or a remote device. The configuration module 504 may further include hardware and/or software that control the operations of the network device 500.

In some implementations, the management module 506 may be configured to manage different components of the network device 500. In some cases, the management module 506 may configure one or more bits in one or more configuration registers at power up, to enable or disable certain capabilities of the network device 500. In certain implementations, the management module 506 may use processing resources from the processing logic 502. In other implementations, the management module 506 may have processing logic similar to the processing logic 502, but segmented away or implemented on a different power plane than the processing logic 502.

The bus interface module 508 may enable communication with external entities, such as a host device and/or other components in a computing system, over an external communication medium. The bus interface module 508 may include a physical interface for connecting to a cable, socket, port, or other connection to the external communication medium. The bus interface module 508 may further include hardware and/or software to manage incoming and outgoing transactions. The bus interface module 508 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 508 may include the physical layer for any of these bus protocols, including a connector, power management, and error handling, among other things. In some implementations, the network device 500 may include multiple bus interface modules for communicating with multiple external entities. These multiple bus interface modules may implement the same local bus protocol, different local bus protocols, or a combination of the same and different bus protocols.

The network interface module 512 may include hardware and/or software for communicating with a network. This network interface module 512 may, for example, include physical connectors or physical ports for wired connection to a network, and/or antennas for wireless communication to a network. The network interface module 512 may further include hardware and/or software configured to implement a network protocol stack. The network interface module 512 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 500 may include multiple network interface modules, each configured to communicate with a different network. For example, in these implementations, the network device 500 may include a network interface module for communicating with a wired Ethernet network, a wireless 802.11 network, a cellular network, an Infiniband network, etc.

The various components and modules of the network device 500, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 6.

Figure 6:
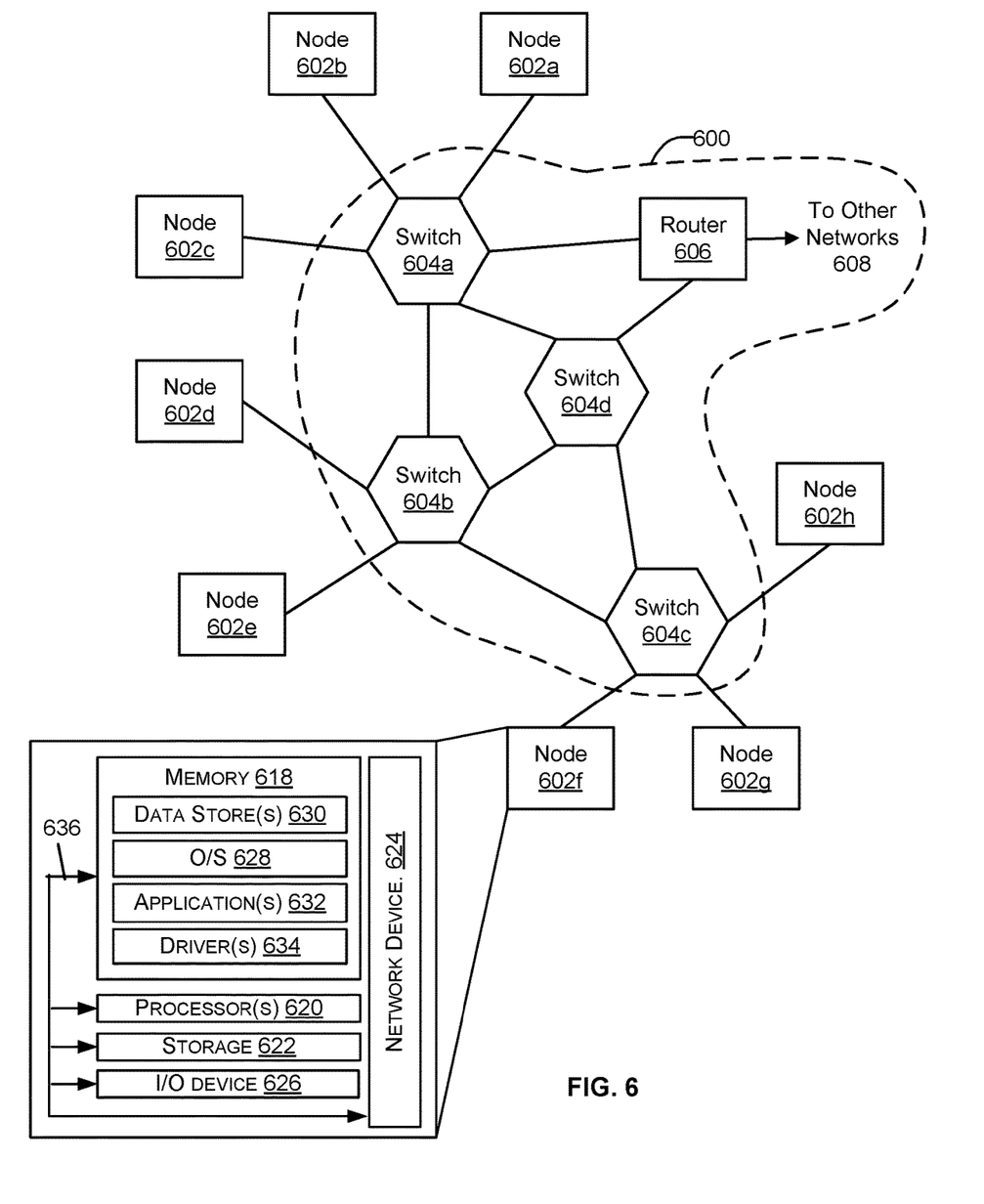
FIG. 6 illustrates an example of a network architecture for features and systems described herein, according to certain aspects of the disclosure.

FIG. 6 illustrates a network 600, illustrating various different types of network devices 500 of FIG. 5, such as nodes comprising the network device, switches and routers. In certain embodiments, the network 600 may be based on a switched architecture with point-to-point links. As illustrated in FIG. 6, the network 600 includes a plurality of switches 604a-604d, which may be arranged in a network. In some cases, the switches are arranged in a multi-layered network, such as a Clos network. A network device 500 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 604a-604d may be connected to a plurality of nodes 602a-602h and provide multiple paths between any two nodes.

The network 600 may also include one or more network devices 500 for connection with other networks 608, such as other subnets, LANs, wide area networks (WANs), or the Internet, and may be referred to as routers 606. Routers use headers and forwarding tables to determine the best path for forwarding the packets, and use protocols such as internet control message protocol (ICMP) to communicate with each other and configure the best route between any two devices.

In some examples, network(s) 600 may include any one or a combination of many different types of networks, such as cable networks, the Internet, wireless networks, cellular networks and other private and/or public networks. Interconnected switches 604a-604d and router 606, if present, may be referred to as a switch fabric, a fabric, a network fabric, or simply a network. In the context of a computer network, terms "fabric" and "network" may be used interchangeably herein.

Nodes 602a-602h may be any combination of host systems, processor nodes, storage subsystems, and I/O chassis that represent user devices, service provider computers or third party computers.

User devices may include computing devices to access an application 632 (e.g., a web browser or mobile device application). In some aspects, the application 632 may be hosted, managed, and/or provided by a computing resources service or service provider. The application 632 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 608. Additionally, the user device(s) may be part of the distributed system managed by, controlled by, or otherwise part of the service provider computer(s) (e.g., a console device integrated with the service provider computers).

The node(s) of FIG. 6 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 632 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 602a-602h may include at least one memory 618 and one or more processing units (or processor(s) 620). The processor(s) 620 may be implemented in hardware, computer-executable instructions, firmware, or combinations thereof. Computer-executable instruction or firmware implementations of the processor(s) 620 may include computer-executable or machine-executable instructions written in any suitable programming language to perform the various functions described.

In some instances, the hardware processor(s) 620 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 618 may store program instructions that are loadable and executable on the processor(s) 620, as well as data generated during the execution of these programs. Depending on the configuration and type of the node(s) 602a-602h, the memory 618 may be volatile (such as RAM) and/or non-volatile (such as ROM, flash memory, etc.). The memory 618 may include an operating system 628, one or more data stores 630, one or more application programs 632, one or more drivers 634, and/or services for implementing the features disclosed herein.

The operating system 628 may support nodes 602a-602h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 628 may also be a proprietary operating system.

The data stores 630 may include permanent or transitory data used and/or operated on by the operating system 628, application programs 632, or drivers 634. Examples of such data include web pages, video data, audio data, images, user data, and so on. The information in the data stores 630 may, in some implementations, be provided over the network(s) 608 to user devices 604. In some cases, the data stores 630 may additionally or alternatively include stored application programs and/or drivers. Alternatively or additionally, the data stores 630 may store standard and/or proprietary software libraries, and/or standard and/or proprietary application user interface (API) libraries. Information stored in the data stores 630 may be machine-readable object code, source code, interpreted code, or intermediate code.

The drivers 634 include programs that may provide communication between components in a node. For example, some drivers 634 may provide communication between the operating system 628 and additional storage 622, network device 624, and/or I/O device 626. Alternatively or additionally, some drivers 634 may provide communication between application programs 632 and the operating system 628, and/or application programs 632 and peripheral devices accessible to the service provider computer. In many cases, the drivers 634 may include drivers that provide well-understood functionality (e.g., printer drivers, display drivers, hard disk drivers, Solid State Device drivers). In other cases, the drivers 634 may provide proprietary or specialized functionality.

The service provider computer(s) or servers may also include additional storage 622, which may include removable storage and/or non-removable storage. The additional storage 622 may include magnetic storage, optical disks, solid state disks, flash memory, and/or tape storage. The additional storage 622 may be housed in the same chassis as the node(s) 602a-602h or may be in an external enclosure. The memory 618 and/or additional storage 622 and their associated computer-readable media may provide non-volatile storage of computer-readable instructions, data structures, program modules, and other data for the computing devices. In some implementations, the memory 618 may include multiple different types of memory, such as SRAM, DRAM, or ROM.

The memory 618 and the additional storage 622, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 618 and the additional storage 622 are examples of computer storage media. Additional types of computer storage media that may be present in the node(s) 602a-602h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 602a-602h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 602a-602h may also include I/O device(s) 626, such as a keyboard, a mouse, a pen, a voice input device, a touch input device, a display, speakers, a printer, and the like. The node(s) 602a-602h may also include one or more communication channels 636. A communication channel 636 may provide a medium over which the various components of the node(s) 602a-602h can communicate. The communication channel or channels 636 may take the form of a bus, a ring, a switching fabric, or a network.

The node(s) 602a-602h may also contain network device (s) 624 that allow the node(s) 602a-602h to communicate with a stored database, another computing device or server, user terminals and/or other devices on the network(s) 600. The network device(s) 624 of FIG. 6 may include similar components discussed with reference to the network device 500 of FIG. 5.

In some implementations, the network device 624 is a peripheral device, such as a PCI-based device. In these implementations, the network device 624 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 508 may implement NVMe, and the network device 624 may be connected to a computing system using a PCIe interface.

A PCI-based device may include one or more functions. A "function" describes operations that may be provided by the network device 624. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 624 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 5, FIG. 6, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device, comprising:
    memory access request intercept logic circuitry for memory management of a computing system, the memory access request intercept logic circuitry coupled between:
        system level cache storing program data; and
        a primary memory device and a secondary memory device that are external to the system level cache,
    wherein the memory access request intercept logic circuitry is configured to:
        periodically check counter values of counters implemented in a portion of the primary memory device, wherein the counters count transactions involving memory addresses in memory pages of the primary memory device;
        determine, based on the counter values, that the memory pages were accessed less frequently than other memory pages of the primary memory device; and
        select the memory pages for reallocation to the secondary memory device,
    wherein the integrated circuit device further comprises a buffer configured to store updates to the counters, and
    wherein the memory access request intercept logic circuitry is configured to buffer the updates to the counters and send one update to the counters for a total number of increments.

* * * * *